United States Patent

Dunaway et al.

[11] 3,715,257
[45] Feb. 6, 1973

[54] METHOD FOR PRODUCING A FLAT PARTICLE-FACED PLYWOOD PANEL

[75] Inventors: Jack W. Dunaway; Michael W. Woodland; Bernard H. Johnson, all of Lewiston, Idaho

[73] Assignee: Potlatch Forests, Inc., San Francisco, Calif.

[22] Filed: Feb. 26, 1971

[21] Appl. No.: 119,188

[52] U.S. Cl. ............... 156/299, 156/300, 156/62.2, 161/270
[51] Int. Cl. .................................................. B27d 1/00
[58] Field of Search......156/297, 299, 300, 279, 310, 156/242, 62.2

[56] References Cited

UNITED STATES PATENTS

| | | | |
|---|---|---|---|
| 3,371,003 | 2/1968 | Goldman | 156/297 |
| 3,563,844 | 2/1971 | Brown | 156/242 |
| 2,606,138 | 8/1952 | Welch | 117/65.2 |
| 2,419,614 | 4/1947 | Welch | 117/65.2 |
| 2,343,740 | 3/1944 | Birmingham | 156/324 |
| 2,804,418 | 8/1957 | King | 156/242 |

Primary Examiner—Ralph S. Kendall
Attorney—Wells, St. John & Roberts

[57] ABSTRACT

A method for minimizing warpage of a plywood assembly having a bonded face of wood particle board or similar material. This is accomplished by curing the particle board layer on a single sheet of veneer, which consequently is used in place of a conventional face veneer in a plywood layup.

10 Claims, 5 Drawing Figures

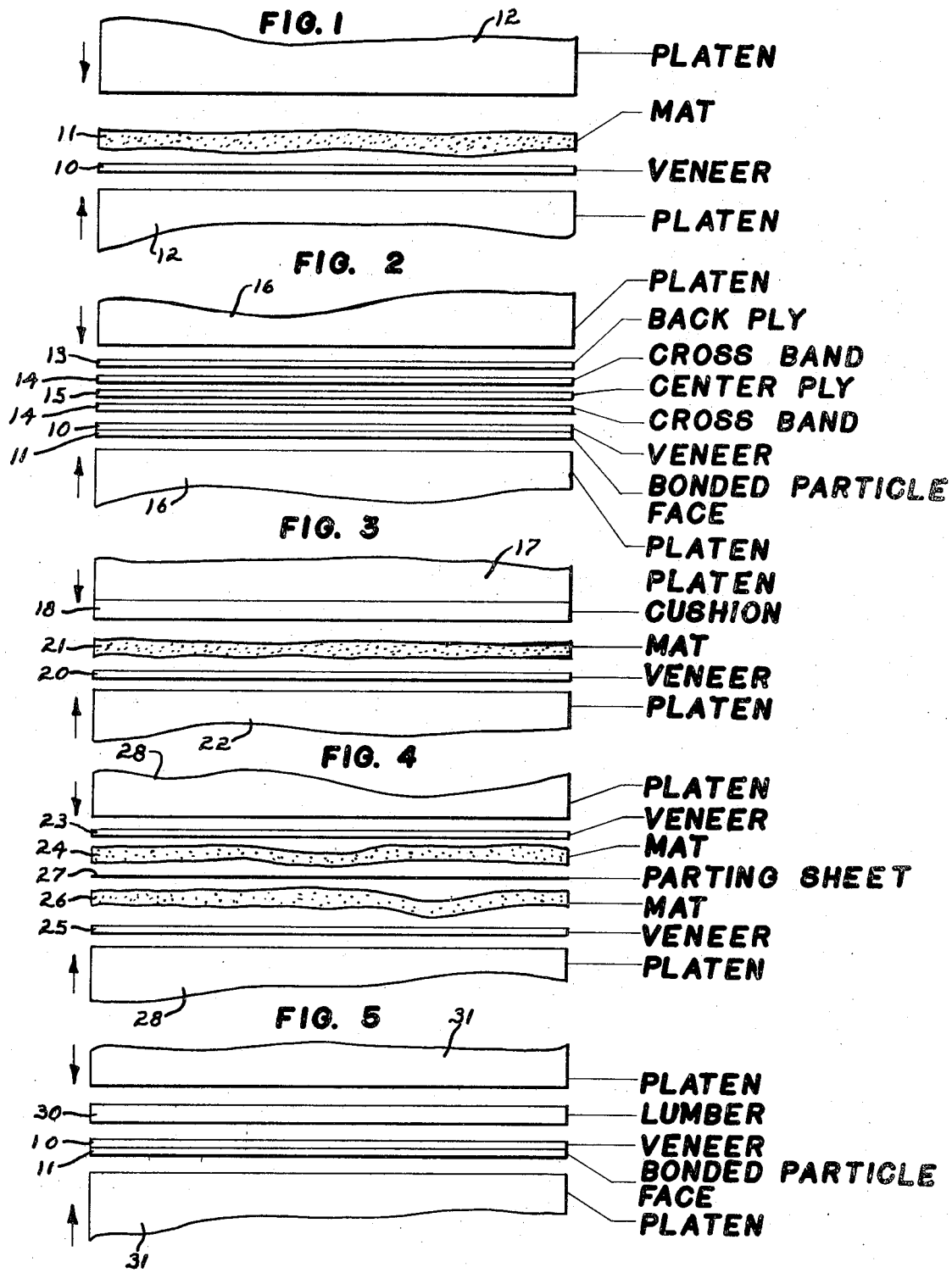

METHOD FOR PRODUCING A FLAT PARTICLE-FACED PLYWOOD PANEL

BACKGROUND OF THE INVENTION

The present description relates to a new and improved method of making a composite wood product such as a plywood panel or coated lumber, in which a coating or covering, known as an "overlay" is bonded to the laminated wood structure. It particularly relates to such products where the overlay is bonded to only one surface of the resulting product. Prior efforts to attain this type of product have been plagued by the tendency of the laminated assembly to warp. The main purpose of the present disclosure is to eliminate or minimize warping or cupping or other physical distortion of the final laminated assembly.

The problem of warping or cupping of plywood panels having an overlay on only one surface is recognized and discussed in U.S. Pat. No. 2,606,138. According to the disclosure of that patent, the problem can be met by preliminary compression of a wood particle mat under heat and pressure to compact the mat without curing the synthetic resin binder during the preliminary pressing step. The mat is then used as an overlay material in the production of plywood.

The present development arose from an effort to produce laminated panels, such as plywood sheathing, having a bonded textured particle board surface at one face thereof. This was attempted first by felting a mat of wood particles and resin binder on sheets of plywood and alternately by bonding pre-pressed and cured layers of the particle board material to plywood sheets. In both cases, unacceptable cupping or warping of the plywood resulted, usually immediately after removal of the final assembly from the press. This was apparently due to the unbalanced construction or due to stresses set up on the pressing or curing of the finished panel. Attempts to remedy this problem involved spraying of water on the back ply or on the base. Papers of different thickness and different adhesives were used on the backs of the panels. Dead stacking with weight on the panels, saw kerfs cut on the back plies or on the face plies of the cured panels were alternate measures that were attempted with no significant success. It was found that using a paper glue line to press particle mats on plywood produced an essentially flat panel. However, this was prohibitively expensive. Also, panels which were made with the particle board overlay on two sides exhibited no cupping. This also was prohibitively expensive.

As a result of this experimentation, it was discovered that by pressing the particle mat on a veneer and using this composite veneer assembly as the face ply of a plywood layup, the resulting cupping of the plywood panel was eliminated or held within acceptable limits. It was this discovery that resulted in the present invention disclosure.

SUMMARY OF THE INVENTION

The invention described herein relates to a basic method of producing flat laminated wood structural members having a particle board face on one side. The method comprises the step of first curing a resin-impregnated mat of fibers or fibrous particles on one surface of a sheet of veneer and subsequently bonding the composite sheet to a structural wood member by the application of pressure and heat in a conventional laminating process. The method is applicable specifically to plywood, which otherwise has a considerable tendency to warp or cup. It also is applicable to the production of structural lumber products having an overlay on one surface and to various types of laminated lumber and laminated veneer assemblies.

The basic object of this invention is to substantially lessen the cupping or warping of panels or other structural wood assemblies having an overlay on only one surface thereof.

Another object of this invention is to accomplish this purpose without substantially deviating from conventional laminating methods and without requiring the use of any specialized equipment or materials.

Another object of this invention is to substantially reduce the expense and handling of particle board overlays by eliminating the necessity of separate cauls in the felting of the resin-impregnated particles to produce a mat. This is accomplished by using a sheet of veneer in place of a caul, the cured particle board face being bonded to the veneer during curing to form a composite sheet later used in the production of the desired laminated product.

These and further objects will be evident from the following disclosure, which generally discusses the application of the method to the production of typical laminated wood structures having a single particle board overlay or face. The specific embodiments of the materials and processes are presented by way of example only. While the description is typical of the application of the present method, the examples are not intended to be exhaustive.

DESCRIPTION OF THE DRAWINGS

FIG. 1 is a schematic view illustrating the laying up and pressing of the fibrous mat and veneer;

FIG. 2 is a similar schematic view illustrating the laying up and pressing of the plywood assembly including the composite panel of particle board and veneer;

FIG. 3 is a view similar to FIG. 1, illustrating the laying up and pressing of textured particle board;

FIG. 4 is another view similar to FIG. 1, illustrating the laying up and pressing of textured particle board assembly; and FIG. 5 is a view similar to FIG. 2, illustrating the laying up and pressing of a laminated lumber assembly including the composite panel of particle board and veneer.

DESCRIPTION OF THE PREFERRED EMBODIMENT

This description relates to the production of laminated wood assemblies having a single overlay of a material such as cured particle board. It is adaptable to the production of a variety of products, including plywood, laminated veneers, lumber, laminated lumber and beams. In all such wood structural assemblies, there is a prevalent tendency for the final laminated product to warp or cup. The problem can be traced to the unbalanced nature of the assembly having an overlay on only one face thereof, and to unbalanced stresses that are set up in the pressing or curing of the final assembly.

The method will first be described as it applies to the production of plywood having an overlay or outer face of particle board material. The term "plywood" as used in this description shall apply to the usual accepted definition of the product. This is a flat panel, built up generally of an odd number of thin sheets or veneers of wood in which the grain direction of each ply or layer is at right angles to the one adjacent to it. Plywood is built up with opposed outer face and back plies plus core stock or crossband veneers, and center plies. The face and back plies generally are oriented with grain direction parallel to the long dimension of the panel, as are the center plies in assemblies comprising more than three layers. The sheets of veneer are united under pressure by a bonding agent or resin to create a laminated panel having an adhesive bond between the layers or plies as strong as, or stronger, than the wood materials.

According to the present invention, resin-treated wood particles or other discrete fibrous particles are felted on single wood veneers and pressed with appropriate heat and pressure against a flat, resilient or textured surface to produce the desired surface pattern on the outer surface of the resulting composite panel of particle board and veneer. This composite panel generally is not flat. However, when it is used as the face or back ply in a plywood layup, the resulting panel emerges flat from the press. It retains the flatness in a manner similar to well-designed plywood. Conventional post-pressing treatment is desirable in the same manner as is typically provided in a plywood operation. Specifically, the plywood should be subjected to hot stacking for 24 hours under a load of one or more units of plywood or similar material.

The general steps of the method are illustrated in FIGS. 1 and 2 as they apply to the production of five-ply plywood having a single overlay of particle board material. FIG. 1 illustrates the laying up and pressing of the composite panel of particle board and veneer. A single sheet of veneer 10 has a mat 11 of resin-treated wood particles applied to one surface by conventional felting or application techniques. The mat 11 is normally placed on veneer 10 in a substantially uniform layer to provide substantially uniform density in the resulting pressed layer. The mat 11 is preferably placed on the tight side of the sheet of veneer 10. The loose side of the sheet of veneer, which results from the peeling of the veneer from a log, is conventionally faced inward in a plywood layup operation.

After application of the mat of fibrous material and resin on the veneer 10, they are subjected to pressure perpendicular to their respective surfaces between conventional heated platens 12. This step can be carried out in a specially designed press, but is readily adaptable to a multiple opening heated press of the type commonly employed in the plywood or particle board industry. The composite panels are loaded into the press openings in the usual manner and pressed under temperature and pressure conditions known in the particle board industry with respect to the particular particle materials and resin binders. This operation is carried out in a manner such as to both cure the resin within the mat 11 and bond the resulting fibrous mat to the abutted surface of veneer 10.

The result of the process illustrated in FIG. 1 is the production of the composite panel that comprises a single sheet of veneer 10 and a cured overlay of particle board 11. As shown in FIG. 2, this composite panel can then be utilized in place of the conventional face or back ply in a plywood layup operation. FIG. 2 illustrates the manner by which the composite panel would be used in the production of five-ply plywood. The plywood layup includes a back ply 13, two crossband layers 14 with an interposed center ply 15 and the composite panel 10, 11. After being laid up, typically by hand, the various layers will have had a suitable adhesive or resin applied to their abutting surfaces and are typically pre-pressed prior to feeding the laid up assembly to a conventional multiple opening hot press as is used in the plywood industry in the manufacture of plywood panels having synthetic resin glue lines. The panels again are loaded into the press opening in the usual manner and pressed under temperature and pressure conditions typical to the production of such plywood. This pressing cycle cures the adhesive or resin between the various layers to create the bond that maintains the plies as a unit.

After pressing, it is best that the flat panels be subjected to hot stacking for 24 hours or more under a load of one or more units of plywood or other similar material in order to maintain the desired flat character of the panels. This conventional operation parallels the usual hot stacking of plywood under present production processes.

The resulting plywood product has been found to be highly acceptable as a flat sheeting material. Its application may be directed to any desired purpose wherein an overlay of particle board is to be utilized on one surface of the assembly. As an example, the plywood having an overlay may be used in exterior building construction as a combination sheathing and siding product with the particle board surface exposed to the building exterior.

In an actual test of the process, panels were made as described above by first pressing the mats in the form of cedar planer shavings treated with 10 percent powdered phenolic resin with 12 to 15 pounds of furnish per panel (4 ft. × 8 ft.). The veneer surface was pre-coated with the phenolic resin (Monsanto-PF 30–15). The composite panel was then laid up in a three-ply plywood panel and pressed for 7 minutes at 360° F. Of eight pressed panels, five showed no cup. The maximum cupping was three-sixteenths inches in the convex direction looking at the particle board surface. Two panels showed ⅛-inch cupping in this convex direction.

In contrast, during the same test, 12 to 15 pounds of the same cedar planer shavings with 10 percent powdered phenol resin were laid up on three layers of plywood that had previously been cured. After curing of the particle board mat and simultaneous bonding of it to the plywood, the least amount of cupping across the face was 1⅝ inches. The greatest amount of cupping of any of the three panels was 1¾ inches. A related test using previously pressed shavings and resin mats which were cured before application to any veneer surface also resulted in objectionable cupping. In these tests, the mats were adhered to a plywood panel with a light coating of phenolic resin (Monsanto-PF 30–15), and pressed at 175 psi and 350° to 360° F.

for six minutes. Of ten panels, the least cupping that resulted was one-half inch and the most cupping was five-eighths inch. These panels, like those with shavings and resin were pressed directly on plywood, showed concave cupping when viewed looking toward the particle board face.

The construction of the particle board can be such that it has a flat face by being pressed against a plane platen, or it might be pressed onto the veneer sheet in a manner such as to develop a roughened or textured outer surface in the manner shown in FIGS. 3 and 4. Referring to FIG. 3, it illustrates the pressing of a mat 21 comprising wood particles and a suitable resin binding onto one surface of a single sheet of veneer 20, between a flat platen 22 and an opposed platen 17. A layer 18 of cushioning material is interposed between platen 17 and mat 21 so as to equalize pressure applied to the mat 21. While this results in the mat 21 of uniform density, it also results in a non-uniformity in the outer mat surface, which will reflect the variations in thickness of the discrete wood particles piled one on another during felting of the mat 21. The resulting composite panel of particle board and veneer can then be used as described above in the production of plywood panels or similar structural units.

FIG. 4 shows an alternate method of producing roughened or textured particle board overlays on single sheets of veneer. According to this method, oppositely facing composite sheet layups are pressed while separated by a resilient parting sheet or other separating layer to prevent bonding of the adjacent wet mats. Specifically, a lower veneer 25 has a mat 26 felted upon its upwardly facing surface. A parting sheet, such as a sheet of butyl rubber or a silicone-treated sheet of paper is then laid upon the mat 26 and a second mat 24 is felted upon it. The mat 24 is then covered by a veneer 23 and the entire assembly pressed between heated platens 28 to cure the resin in the respective mats 26, 24. This results in the production of two complementary textured overlays bonded to the respective single sheets of veneer 25, 23.

Further details with respect to the production of textured particle board are available in the patent disclosures of Willey, U.S. Pat. No. 2,431,720, Gottschalk, U.S. Pat. No. 3,188,367 and Boehm et al., US. Pat. No. 2,766,162.

FIG. 5 schematically illustrates the manner by which the composite panel 10, 11 produced by the method illustrated in FIG. 1 can be used to provide a particle board overlay on a piece of conventional structural lumber 30. The board 30 is pressed against the surface of veneer 10 with the bonded particle board face 11 facing oppositely to it. The abutting wood surfaces are coated with a bonding resin or adhesive and the assembly pressed between heated platens 31 to cure the resin between the layers. The board 30 can be either a solid board of natural wood material or might be constructed of multiple layers laminated simultaneously with the application of the composite panel 10, 11 in a conventional laminating process. Multiple boards might be similarly laminated in a beam process where one beam surface is to have a particle board overlay.

The present method also can be applied to produce a particle board overlay on laminated veneers laid up with the grain of each layer parallel to one another. The method would be substantially identical to that described with respect to FIG. 2, with the modification that the grain of each layer of veneer would be parallel in the laid up assembly.

The use of an overlay of particle board is particularly desirable in that it permits the upgrading of veneers or boards which might otherwise be acceptable structurally, but whose appearance would not permit their use in an exposed location. Because the particle board overlay covers the structural backing materials, voids left by knots can be plugged prior to lamination and veneers and board surfaces that include checked areas that close on pressing are acceptable.

One modification from the usual process steps involved in the production of plywood, which we have found to yield preferable results, is the use of a longer pre-press time than conventional for plywood layup. We have found that maximum flatness in the final plywood product is obtained by using a pre-press time 50 to 100 percent longer than normal, the time being approximately 3 or 4 minutes.

While the present method has been described with respect to the production of wood particle board having a resin binder, it can be carried into the production of other overlays comprising discrete fibrous mats and suitable binders cured by pressure and heat.

The success of the present method evidently relates to the equalization of the application of moisture at both sides of the plywood core during production of the final product. Furthermore, it appears that the secondary pressing of the particle board during the curing of the plywood bonds serves to flatten the particle board layer under heat application and relieves mechanical stresses set up in the fibers of the particle boards during initial pressing thereof.

Modifications might be made in the basic method without deviating from the steps set out above. Therefore, only the following claims are intended to define the described invention.

Having thus described our invention, we claim:

1. A method of producing a flat laminated wood product having single facing of resin-impregnated wood particles comprising:

first pressing a relatively thick wet mat of resin-impregnated wood particles upon one surface of a wood veneer sheet under sufficient pressure and heat to cure the resin and bond it and the particles to the wood veneer to form a composite sheet;

subsequently bonding the composite sheet to a backing of wood veneer material, using conventional laminating techniques, the particle face being directed outward at one face of the resulting lamination.

2. A method as set out in claim 1 wherein the step of bonding the composite sheet to a backing of wood veneer material comprises:

laying up a plurality of layers of wood veneer with a resin coating applied between adjacent wood veneer surfaces;

laying up the composite sheet as an outer or face veneer at one side of said layers of wood veneer with a similar resin coating applied between the adjacent wood veneer surfaces;

and subjecting the layers of wood veneer and composite sheet to sufficient heat and pressure perpendicular to the veneer surfaces to cure the resin coatings.

3. A method as set out in claim 1 wherein the step of bonding the composite sheet to a backing of wood material comprises:

laying up a plurality of alternately oriented veneers in an assembly comprising a back veneer and core stock assembled thereon;

applying a resin coating to the abutting veneer surfaces of the assembly;

laying up the composite sheet by placement of its veneer surface in abutment with the side of the core stock opposite to the back veneer;

applying a resin coating to the abutting veneer surfaces of the core stock and composite sheet;

and subjecting the assembly and composite sheet to sufficient heat and pressure perpendicular to the veneer surfaces to cure the resin coatings.

4. A method as set out in claim 1, wherein the pressing of the mat and wood veneer is carried out with a cushioned caul abutting the mat material surfaces.

5. A method as set out in claim 1, wherein the pressing of the mat is carried out by pressing oppositely facing composite sheet layups separated by a resilient parting sheet separating their respective mats.

6. A method as set out in claim 1 wherein the mat of particles is placed upon the tight side of the wood veneer sheet in forming of the composite sheet.

7. A method as set out in claim 1, wherein the wood particles comprise wood shavings.

8. A method of producing flat laminated veneer assemblies having one face comprising fibrous wood particles bonded by a resin binder, comprising the following steps:

laying up the fibrous wood particles and resin binder as a relatively thick mat on the tight surface of a first layer of wood veneer;

subjecting the wood veneer and mat to sufficient pressure and heat to cure the resin and bond the cured particle mat to the wood veneer;

subsequently laying up additional layers of wood veneer and laminating resin, using the first layer of wood veneer and cured mat as a face veneer with the mat facing outwardly in the assembly, the laminating resin being applied to abutting wood veneer surfaces in each layer;

and curing the laminating resin by subjecting the assembly to pressure and heat.

9. A method as set out in claim 8 wherein the additional layers of wood veneer comprise conventional plywood face veneers and core stock laid up in a balanced assembly, the first layer of wood veneer and bonded particle mat substituting for one of the conventional face veneers in such a plywood assembly.

10. A method as set out in claim 9 wherein the cured plywood assembly is subjected to conventional postpressing treatment by hot stacking for approximately 24 hours under a load of one or more units of plywood or similar material.

* * * * *